United States Patent [19]

Yoshida et al.

[11] Patent Number: 5,294,584
[45] Date of Patent: Mar. 15, 1994

[54] PROCESS FOR PRODUCING A DENITRATION CATALYST

[75] Inventors: Naomi Yoshida; Hitoshi Yamasaki; Ikuhisa Hamada; Yasuyoshi Kato; Kunihiko Konishi; Toshiaki Matsuda; Yuji Fukuda, all of Hiroshima, Japan

[73] Assignee: Babcock-Hitachi Kabushiki Kaisha, Tokyo, Japan

[21] Appl. No.: 771,403

[22] Filed: Oct. 2, 1991

Related U.S. Application Data

[63] Continuation-in-part of Ser. No. 525,535, May 18, 1990, Pat. No. 5,155,083.

[30] Foreign Application Priority Data

May 19, 1989 [JP] Japan ................................. 1-126456
Aug. 1, 1989 [JP] Japan ................................. 1-200070

[51] Int. Cl.$^5$ .................... B01J 37/02; B01J 21/06; B01J 21/08; B01J 23/16
[52] U.S. Cl. .................... 502/242; 502/247; 502/254; 502/255; 502/527; 502/439; 502/350; 502/349; 502/251; 502/308; 502/309; 423/239.1
[58] Field of Search .......... 502/242, 247, 254, 255, 502/527, 308, 309, 312, 321, 322, 251; 423/239 A

[56] References Cited

U.S. PATENT DOCUMENTS

4,280,926 7/1981 Abe et al. ................. 502/527 X
4,608,361 8/1986 Kanamori et al. ............ 502/527 X

FOREIGN PATENT DOCUMENTS

0398752 11/1990 European Pat. Off. .......... 502/242
53-082685 7/1978 Japan .......................... 502/242
58-153538 9/1983 Japan .......................... 502/242

Primary Examiner—W. J. Shine
Assistant Examiner—Douglas J. McGinty
Attorney, Agent, or Firm—Fay, Sharpe, Beall, Fagan, Minnich & McKee

[57] ABSTRACT

A process for producing a denitration catalyst comprising the following steps of immersing a base material composed of an inorganic fiber cloth in an aqueous slurry containing 5 to 20% by weight of at least one sol-form substance selected from the group consisting of silica sol, titania sol and zirconia sol, as a first component, 20 to 70% by weight of at least one inorganic oxide fine powder selected from the group consisting of those of titania, zirconia and cordierite, as a second component, and 1 to 3% by weight of at least one organic binder selected from the group consisting of polyvinyl alcohol, polyvinyl acetate and carboxymethyl cellulose, as a third component, removing superfluous liquid from the resulting base material, drying the base material, coating catalyst components onto the surface of the dried base material, and drying and calcining the resulting material, are proposed.

3 Claims, 1 Drawing Sheet

PROCESS FOR PRODUCING A DENITRATION CATALYST

This is a continuation-in-part of copending application(s) Ser. No. 07/525,535 filed on May 18, 1990, now U.S. Pat No. 5,155,083.

BACKGROUND OF THE INVENTION

1. Field of the Invention

This invention relates to a process for producing a denitration catalyst. Particularly, it relates to a process for producing a denitration catalyst for ammonia reduction, using an inorganic fiber cloth as its base material.

2. Description of the Related Art

Denitration catalysts for exhaust gases using as the base materials thereof, the inorganic fiber sheet such as inorganic fiber woven fabric, mat, making sheet, etc. have so far been known, and many inventions have been made. As representatives of such catalysts, a catalyst obtained by supporting a catalyst composition on a silica fiber woven fabric (Japanese patent application laid-open No. Sho 52-37592), a catalyst obtained by dispersing ceramic fibers and a catalyst composition powder in water, followed by making the dispersion into a sheet form according to making process (Japanese patent application laid-open No. Sho 55-39256), a catalyst obtained by supporting by impregnation, a catalyst component on a honeycomb-form carrier prepared by adhering ceramics sheets in a corrugated form (Japanese patent application laid-open No. Sho 59-193139), etc. have been known.

In general, in denitration apparatuses for exhaust gases such as boilers, it is necessary to use a catalyst in a quantity of several tens to several hundreds $m^3$ per one plant. Thus, as such a catalyst, a product having a large structural body and a high strength are required. Further, exhaust gases often contain corrosive gases including sulfur oxides besides a large quantity of dusts. Thus, it is necessary for the catalyst to retain its activity and strength for a long time even in such corrosive circumstance.

While the catalysts disclosed in the above prior art have many advantages of being light, difficult to be cracked by impact, etc., the above-mentioned requirements have not been met sufficiently and when the catalysts have been made up into a structural body of catalyst, they have been inferior in the aspect of strength and economy to a catalyst using a metal substrate or a honeycomb catalyst prepared according to extrusion-molding process; thus they have not always often been employed.

As described above, in the prior art, a sufficient consideration in the aspect of strength and production cost has not been taken; thus a problem has been raised for obtaining a large-size catalyst in a large quantity.

SUMMARY OF THE INVENTION

An object of the present invention is to provide a process for producing a catalyst having overcome the above mentioned drawbacks and having a high strength body based on an inorganic fiber cloth as a base material.

The above object can be achieved by coating the surface of an inorganic fiber cloth or mesh with a coating layer consisting of a first component of a sol-form substance such as colloidal silica, a second component of fine powder of inorganic oxide such as titanium oxide, and a third component of an organic binder such as polyvinyl alcohol, followed by coating onto the resulting material as a base material, a catalyst composition paste, by means of rollers.

Namely, the present invention resides in:

A process for producing a denitration catalyst, which comprises immersing a base material composed of an inorganic fiber cloth in an aqueous slurry containing 5 to 20% by weight of at least one sol-form substance selected from the group consisting of silica sol, titania sol and zirconia sol, as a first component, 20 to 70% by weight of at least one inorganic oxide fine powder selected from the group consisting of those of titania, zirconia and cordierite, as a second component, and 1 to 3% by weight of at least one organic binder selected from the group consisting of polyvinyl alcohol, polyvinyl acetate and carboxymethyl cellulose, as a third component, removing superfluous liquid from the resulting base material, drying the base material, coating catalyst components onto the surface of the dried base material, and drying and calcining the resulting material.

DETAILED DESCRIPTION OF PREFERRED EMBODIMENTS

Figure 1:
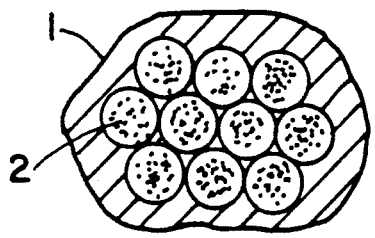
FIG. 1 shows the cross-sectional view of a twist yarns 2 constituting an inorganic fiber cloth coated with a coating layer 1 as a base material of the present invention.
Figure 2:
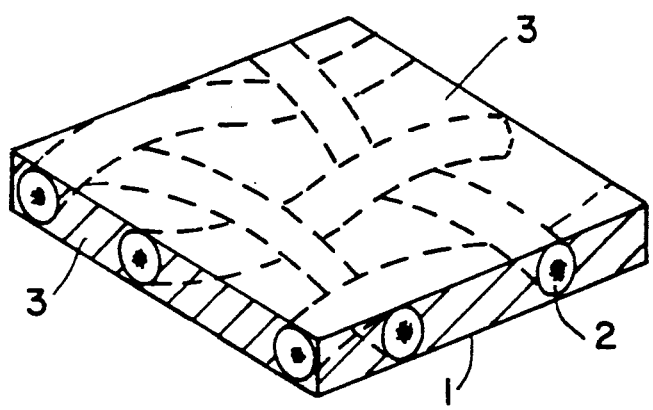
FIG. 2 shows a typical view illustrating the constitution of the catalyst of the present invention.

The intermediate layer formed on the twist yarns of the inorganic fiber cloth as shown in FIG. 1, bundles the inorganic fibers to afford stiffness and elasticity thereto to form metal gauze-like base material, whereby it is possible to coat a catalyst component paste having a small water content on the base material by press rollers and hence it is possible to obtain a sheet-like catalyst having a high density and a high strength. Further, the coating layer as the intermediate layer forms a smooth surface state due to the function of the fine particle titania and the organic binder, and also has a low hygroscopicity.

Thus, the frictional resistance between the catalyst paste and the base material is so low that the filling of the catalyst paste into the inside of the meshes of the base material becomes easy and it is possible to coat it at a high speed by means of press rolls.

On the other hand, in the thus obtained catalyst body, the inorganic fibers do not contact directly with the catalyst component by the medium of the intermediate layer, so that there occurs no reduction in the strength of the body by reaction of the fibers with reactive oxides such as those of vanadium, molybdenum, tungsten, etc., generally used as active catalyst components.

Further, since the fiber surface is coated by the dense coating layer, there is a merit that reduction in the strength due to corrosive gases contained in exhaust gases can be prevented.

As the inorganic fibers cloth used in the present invention, any of those cloth may be employed, but plain weave inorganic fiber cloth having openings of about 8 to 20 meshes and a thickness of 0.3 to 1 mm afford good results. These fiber cloth is obtained by plain-weaving twist yarns which are prepared by twisting glass fibers, silica fibers or silica-alumina fibers having a diameter of several to several tens microns. In a typical example of the present invention, this inorganic fiber cloth has a slurry containing a sol-form colloidal silica, titanium oxide power, about 90% of which has a particle diameter of 1 μ or less, and polyvinyl alcohol, supported thereon according to immersion method or spray method, followed by drying the resulting material at 100° to 200° C., to form an elastic base material for supporting catalyst components.

As the first component of the slurry used herein, various kinds of silica sol, titania sol or zirconia sol may be used. As the second component, those having a small particle diameter and being stable to heat and non-reactive with SOx contained in exhaust gases are preferred, and fine particle of titania prepared according to chlorination method is particularly preferred. As the organic binder as the third component, polyvinyl alcohol, carboxymethyl cellulose or polyvinyl acetate may be used, and polyvinyl alcohol is particularly preferred, since when it is used, the viscosity of the slurry if easily adjusted and a stable slurry can be prepared. Further, as to the concentrations of the components, 5 to 20, 20 to 70 and 1 to 3% by weight of the respective components give good results.

Figure 3:
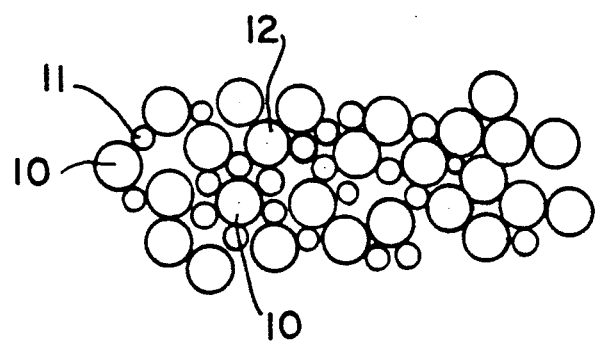
FIG. 3 shows a view illustrating an intermediate coating layer.

As to the thus obtained base material, a mixture of known catalyst components composed mainly of titanium oxide, and other active component(s) selected from molybdenum oxide, vanadium oxide and tungsten oxide, etc. These catalyst components are preferred to be mixed with ceramics fibers and kneaded with water. The resulting pasty catalyst component mixture is coating on the above base material by means of rollers and processing the resulting material into a catalyst sheet of about 1 mm thick. FIG. 3 shows the thus obtained catalyst sheet composed of inorganic fiber cloth (twist yarns) 2, an intermediate coating layer 1 and catalyst components 3. This sheet is further processed into an optional form such as corrugated form, projection and depression form, etc., followed by crying and further calcining. The resulting product is used as an element for the catalyst structural body. Usually, the product is cut into a sheet-form element of about 500 mm (longitudinal) and about 500 mm (lateral), which is then stacked at definite intervals to form a structural body having a unit shape of 500 mm (longitudinal) ×500 mm (lateral) ×500 to 1,000 mm (long), for example.

In the organic fiber cloth provided with a coating layer, according to the present invention, the outer periphery of the inorganic fiber twist yarns of the cloth is coated by a dense coating layer (see FIG. 1) to form a structure like a vinyl-coated electric wire. Thus, the product has characteristics that even when the product is bent, the inside fibers can move to a definite extent so that it is hard to break, and since it has an elasticity, it has a high resistance to bending. Further, even when the catalyst paste is coated on the base material under pressure, the dense coating layer of the cloth functions as a protective layer so that fiber breakage in the cloth is not observed up to a high pressure. Thus, it is possible to coat a catalyst paste having a low water content on the cloth, and also it is possible to obtain a catalyst having a high density and a high strength. Further, the surface of the coated cloth is so smooth that the frictional resistance to the catalyst paste at the time of the coating is decreased, and the filling of the catalyst paste into the inside of the cloth is improved, which is effective for improving the strength. Further, as described above, since direct contact of the inorganic fibers with catalyst components and exhaust gases is prevented, strength reduction due to reaction of these substances with the inorganic fibers is prevented.

The properties of the coating layer of the inorganic fiber cloth yielding such effectiveness could have been realized for the first time by combining the above-mentioned three components. Namely, in the case of a product obtained by coating using only a colloidal silica of the first component, silica particles are impregnated down to the inside of the twist yarns of the cloth to adhere the whole of the twist yarns together, thereby blocking the movement of the fibers when bent. As a result, only a brittle base material is obtained, which is not only broken at the time of coating the catalyst paste on the base material by rolls, but also a resulting catalyst has a very low resistance to bending. In the case of single use of the titania fine particles of the second component, while a coating layer is formed on the surface of the twist yarns of the cloths, the adhesion strength of the coating layer itself is so low that the layer is peeled off by a slight bending.

On the other hand, in the case of single use of the organic binder of the third component, while a definite strength is obtained, the binder is burnt off by calcination of the catalyst and a large clearance occurs between the catalyst components and the fibers to cause strength reduction.

As to a function of the coating layer of the present invention, FIG. 3 is referred to. This figure shows a mixing state of the three components of the intermediate coating layer which is coated on the base material. It is considered that a further smaller colloid form silica 11 adheres to the titanium particles 10, and polyvinyl alcohol as a binder 12 fills the clearances therebetween to form a dense and soft coating layer, thereby exhibiting superior properties as the base material for the denitration catalyst.

The present invention will be described in more detail, but it should not be construed to be limited thereby.

EXAMPLE 1

A commercially available silica sol (Snowtex-N, registered trademark, made by Nissan Kagaku Co., Ltd., $SiO_2$ content: 20 wt. %) (750 g), titania prepared according to chlorination process (CR-50 made by Ishihara Sangyo Co., Ltd.) (750 g) and polyvinyl alcohol (made by Kishida Kagaky Co., Ltd., polymerization degree: about 20,000) (15 g) were mixed together on heating to prepare a slurry-form coating solution, followed by immersing in the slurry, a plain fiber cloth (500 mm wide ×500 mm long) obtained by weaving twist yarns consisting of 3,000 ends of E glass fibers each having a fiber diameter of 6 μm, so that openings of about 100 meshes of the cloth is obtained, squeezing the resulting material by passing it through sponge rollers, drying and heat-treating at 150° C. for 30 minutes. Separately, metatitanic acid slurry, ammonium molybdate and ammonium metavanadate were weighed so as to give an atomic ratio of Ti/Mo/V=93/5/2, followed by kneading them on heating by means of a kneader, extruding the resulting pasty substance so as to give a columnar material of about 3φ, granulating it, drying the granules at 150° C. in a fluidized bed, precalcining at 550° C. for 2 hours, grinding the thus obtained catalyst granules by means of a hammer mill, further kneading the thus obtained catalyst powder (20 kg), ceramics fibers in a ratio of $SiO_2/Al_2O_3$ of about 1 (4 kg) and water (9 kg) by means of a kneaded to prepare a catalyst paste, placing this paste on the previously prepared metal gauze-form base material, coating the paste by means of press rollers at a peripheral speed of 5 m/min, to prepare a sheet-form of about 1 mm thick, air-drying for 12 hours and calcining it at about 550° C. for 2 hours to obtain a sheet-form catalyst.

EXAMPLE 2

Example 1 was repeated except that titania powder was replaced by cordierite powder ground by a ball mill, to prepare a catalyst.

EXAMPLE 3

Example 1 was repeated except that polyvinyl alcohol was replaced by sodium salt of carboxymethyl cellulose (5 g), to prepare a catalyst.

EXAMPLE 4

To a metatitanic acid slurry (60 kg) according to sulfuric acid process and containing 30% by weight of titanium oxide ($TiO_2$) were added ammonium metavanadate ($NH_4VO_3$) (0.62 kg) and ammonium molybdate (($NH_4)_6Mo_7O_{24} \cdot 4H_2O$) (4.51 kg), followed by kneading the mixture while vaporizing water by means of a kneader heated to 140° C. The resulting paste having a water content of 38% by weight was molded into granules of 3 mm in outer diameter and 10 mm in length by means of an extrusion granulator, followed by drying in a fluidized-bed dryer. The resulting dried granules were calcined at 560° C. for 2 hours while passing air, followed by grinding by means of a hammer mill so as to give a particle size distribution in which particles of 20 $\mu$m or less occupy 90% or more, to obtain a powder of catalyst.

Water (3 kg) was added to a mixture of the above catalyst powder (7.9 kg) with inorganic fibers (Kaowool, tradename, 2.1 kg), followed by kneading for 30 minutes by means of a kneader to obtain a catalyst paste having a water content of 23% by weight.

Next, a glass fiber cloth (E glass, 10 ends/inch, 460° C./2 h heat-cleaning material) was impregnated with a 60% by weight slurry of $SiO_2/TiO_2$/PVA (Polyvinyl alcohol) = 14/84/2 (weight ratio) ($SiO_2$ particle diameter: $10-20 \times 10^{-2}$ $\mu$m, $SiO_2$ average particle diameter: 0.5 $\mu$m), followed by drying at 120° C., to obtain a catalyst.

EXAMPLE 5

Example 1 was repeated except that the glass fiber cloth was replaced by another glass fiber cloth (E glass, 8 ends/inch, 460° C./2 h heat-cleaning material).

COMPARATIVE EXAMPLE 1

The glass fiber cloth used in example 1 was not subjected to coating treatment, to prepare a catalyst.

EXAMPLE 6

A glass fiber cloth impregnated with the 60 wt. % slurry of $SiO_2/TiO_2$/PVA = 14/84/2 (weight ratio) of Example 4 was dried, followed by impregnating a 55 wt. % catalyst slurry, drying the resulting material and applying 2% PVA thereon. Two sheets of the resulting material was calendered so as to place a catalyst paste therebetween, followed by molding by means of a roll press, drying and calcining in air at 550° C. for 2 hours to obtain a catalyst.

COMPARATIVE EXAMPLES 2, 3 AND 4

Example 1 was repeated except that three kinds of base materials, that is, a base material treated using only the silica sol shown in Example 1, a base material treated using a dispersion of titanium oxide powder in water (750 g), and a base material treated using a solution of polyvinyl alcohol dissolved in water (1,500 g), were prepared.

COMPARATIVE EXAMPLE 5

Example 4 was repeated except that a glass fiber cloth (E glass, 10 ends/inch, bundling agent: phenol resin) was used as an inorganic fiber cloth and no reinforcing treatment with $SiO_2/TiO_2$/PVA slurry was carried out, to produce a catalyst.

With the catalysts obtained in Examples 1-3 and Comparative examples 1-4, their tensile strengths and bending strengths were measured under the following conditions to confirm the effectiveness of the present invention:

(1) Tensile strength:
  Dimension of test piece: 20 mm wide × 50 mm long.
  Tensile speed: 2 mm/min.
(2) Flexural strength:
  Method: three-point bearing method
  Dimension: 20 mm wide × 50 mm long
  Rate of pressurizing: 2 mm/min.
The results are shown in Tables 1 and 2.

TABLE 1

| No. | Examples | Coating agent | Strength (kg/cm$^2$) Tensile | Flexural | Note |
|---|---|---|---|---|---|
| 1 | Example 1 | Silica sol + titania + PVA | 270 | 260 | |
| 2 | Example 2 | Silica sol + cordierite + PVA | 310 | 240 | |
| 3 | Example 3 | Silica sol + titania + CMC | 240 | 230 | |
| 4 | Comp. ex. 1 | — | — | — | Coating, bad |
| 5 | Comp. ex. 2 | Silica sol | 80 | 20 | |
| 6 | Comp. ex. 3 | Titania | — | — | Coating, bad |
| 7 | Comp. ex. 4 | PVA | 260 | 30 | |

*PVA: polyvinyl alcohol
CMC: carboxylmethyl cellulose

TABLE 2

| No. | Examples | Coating agent | Tensile *1 strength (kg/15 mm breadth × 1 mm length) | Flexural strength (kg/cm$^2$) |
|---|---|---|---|---|
| 8 | Example 4 | $SiO_2/TiO_2$/PVA | 24.5 (19.6) | 225.0 |
| 9 | Example 5 | $SiO_2/TiO_2$/PVA | 24.0 (21.5) | 185.5 |
| 10 | Example 6 | $SiO_2/TiO_2$/PVA | 42.3 (18.3) | 298.4 |
| 11 | Comp. ex. 5 | no coating agent | 4.1 (15.3) | 120.0 |

*1 Strength of glass fibers impregnated with a coating agent

In the case of the catalyst of Comparative example 1 having no coating treatment, a stiffness and an elasticity of the base material were low, and the catalyst was deformed after coating of the catalyst paste, and no test piece of the catalyst for strength measurement was obtained. Further, in the case of the catalyst of Comparative example 2 subjected to silica sol, alone, the base material was so brittle that the yarns were broken during the catalyst-coating process and only a catalyst having a low tensile strength and flexural strength was obtained. In the case of the catalyst of Comparative example 3, catalyst molding was not successful as in the case of untreated catalyst; thus no test piece for strength measurement was obtained. In the case of the catalyst of Comparative example 4, a catalyst having a good appearance and also a high tensile strength was obtained, but its flexural strength was very low. The reason is considered that clearance was formed between the fiber cloth and the catalyst components.

As compared with the above catalysts of Comparative examples, any of the catalysts of Examples exhibited a high tensile strength and a high flexural strength. Thus, it is evident that the process of the present invention is a superior process for obtaining a high strength catalyst.

According to the present invention, it is possible to impart a high stiffness and elasticity to an inorganic fiber cloth as a base material, having a superior tensile strength but having no stiffness. Further, the intermediate coating layer protects the surface of the inorganic fiber cloth, and also the fibers inside the coating layer are bundled in a state where the fibers are movable to a definite extent so that the fibers have a high elasticity, to cause no breakage due to bending. Thus, it is possible to coat the catalyst paste onto the base material in the form of a paste having a low water content; thus it is possible to easily prepare a catalyst having a high strength. As a result, it is possible to produce a large-dimension catalyst at a low cost. Still further, there is no deterioration in the properties of the base material, due to exhaust gases.

What we claim is:

1. A process for producing a denitration catalyst, comprising the steps of:
   (a) immersing a base material comprised of an inorganic fiber cloth in an aqueous slurry containing 5 to 20% by weight of at least one sol-form substance selected from the group consisting of silica sol, titania sol and zirconia sol, as a first component, 20 to 70% by weight of at least one inorganic oxide fine powder selected from the group consisting of titania, zirconia and cordierite, as a second component, and 1 to 3% by weight of at least one organic binder selected from the group consisting of polyvinyl alcohol, polyvinyl acetate and carboxymethyl cellulose, as a third component;
   (b) removing superfluous liquid from the resulting base material;
   (c) drying the base material;
   (d) coating a catalyst paste onto the surface of the dried base material by means of press rollers; and
   (e) drying and calcining the resulting material.

2. A process for producing a denitration catalyst according to claim 1, wherein said inorganic fiber cloth is a fiber glass cloth.

3. A process for producing a denitration catalyst according to claim 1, wherein said catalyst paste is comprised of catalyst components selected from titanium oxide, vanadium oxide, molybdenum oxide and tungsten oxide.

* * * * *